US009021458B1

(12) United States Patent
Jacob et al.

(10) Patent No.: US 9,021,458 B1
(45) Date of Patent: Apr. 28, 2015

(54) VERTICALLY INTEGRATED CONTINUOUS DELIVERY OF AN APPLICATION

(71) Applicant: Chef Software, Inc., Seattle, WA (US)

(72) Inventors: Adam Brent Jacob, San Francisco, CA (US); Seth Yosef Falcon, Seattle, WA (US); Lamont Curtis Granquist, Seattle, WA (US); Jon Morrow, Seattle, WA (US); Christopher Brown, Issaquah, WA (US); Kevin Smith, Raleigh, NC (US)

(73) Assignee: Chef Software, Inc., Seattle, WA (US)

( * ) Notice: Subject to any disclaimer, the term of this patent is extended or adjusted under 35 U.S.C. 154(b) by 0 days.

(21) Appl. No.: 14/315,047

(22) Filed: Jun. 25, 2014

(51) Int. Cl.
*G06F 9/44* (2006.01)
*G06F 9/445* (2006.01)
*H04L 29/08* (2006.01)

(52) U.S. Cl.
CPC . *G06F 8/65* (2013.01); *H04L 67/10* (2013.01)

(58) Field of Classification Search
CPC .......................................................... G06F 8/65
USPC ......................................................... 717/169
See application file for complete search history.

(56) References Cited

U.S. PATENT DOCUMENTS

| 7,877,780 | B2* | 1/2011 | Kolawa et al. ............... 726/1 |
| 8,522,083 | B1* | 8/2013 | Cohen et al. ............ 714/38.1 |
| 2007/0169083 | A1* | 7/2007 | Penubolu et al. ........... 717/168 |
| 2009/0235244 | A1* | 9/2009 | Enomori et al. ............ 717/170 |
| 2009/0288071 | A1* | 11/2009 | Seidman et al. ............. 717/126 |
| 2011/0078675 | A1* | 3/2011 | Van Camp et al. .......... 717/170 |
| 2011/0252415 | A1* | 10/2011 | Ricci ............................. 717/173 |
| 2012/0297375 | A1* | 11/2012 | Burke, Jr. ..................... 717/173 |
| 2014/0053145 | A1* | 2/2014 | Steigleder ..................... 717/169 |
| 2014/0068595 | A1* | 3/2014 | Belinsky et al. ............. 717/173 |
| 2014/0137071 | A1* | 5/2014 | Wadhwani et al. .......... 717/101 |

* cited by examiner

*Primary Examiner* — Don Wong
*Assistant Examiner* — Theodore Hebert
(74) *Attorney, Agent, or Firm* — John W. Branch; Lowe Graham Jones PLLC

(57) ABSTRACT

Embodiment are directed towards managing application delivery over a network. Change information that corresponds to changes to an application may be provided to a delivery pipeline. The change information may be verified in part based on a static analysis of the content of the change information, compiling, and unit testing. Reviewers may be notified to approve the change information. A version of the application that includes the change information may be generated. Acceptance testing may be performed that includes provisioning computing resources in an acceptance computing environment. And, deploying a version of application that includes the change information into the acceptance computing environment. If the acceptance testing passes, a shipping operation may be enabled pausing the delivery pipeline until an authorized user activates the shipping operation restarting the delivery pipeline and deploying the application to one or more computing environments.

30 Claims, 10 Drawing Sheets

VERTICALLY INTEGRATED CONTINUOUS DELIVERY OF AN APPLICATION

TECHNICAL FIELD

This invention relates generally to managing and controlling the distribution of application over a network, and more particularly, but not exclusively, to managing and controlling the continuous delivery an application to one or more computing environments.

BACKGROUND

Increasingly, applications and services are intended to be continuously available and/or Operative. Accordingly, software developers may provide software changes, including updates, bug fixes, patches, or the like, directly into live and operating services. Also, modern software development practices may require products and features to be released at a much faster pace. Accordingly, rather than having one or two large releases a year, product development teams are Shipping much smaller releases several times a year. Further, as these applications and services become more expansive and complicated each application or service may be supported by multiple development teams, each dedicated to only a portion of a service or application. The separate teams may often provide changes to the application that may impact other teams that may be responsible for other parts of the application. The combination of incremental changes and separate somewhat independent development teams may increase the risk the changes may be propagated to the live application environment that may negatively impact performance and/or user satisfaction. Thus, it is with respect to these considerations and others that the invention has been made.

DETAILED DESCRIPTION OF THE EMBODIMENTS

Figure 1:
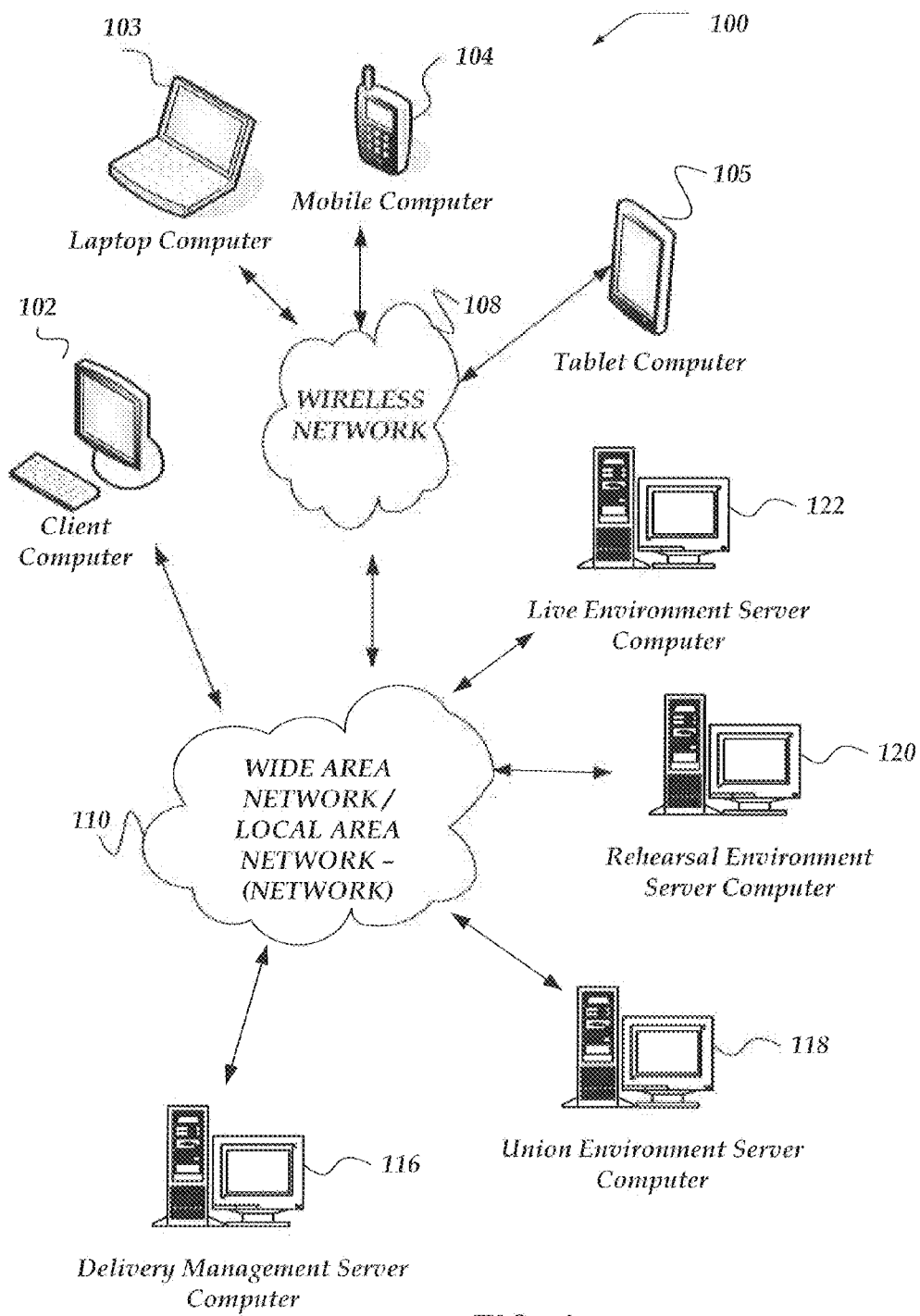
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different Embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the of "a," "an," and "the" include plural references. The meaning of "in" includes "in" and "on."

For example embodiment, the following terms are also used herein according to the Corresponding meaning, unless the context clearly dictates otherwise.

The term "configuration management software" as used herein refers to software applications that provide features designed to perform tasks related to managing computing systems, such as, cataloging on-board hardware and software, provisioning software, upgrading software, license management, installing software, configuring software settings and preferences, configuring user settings and preferences, or the like. Some configuration management software may generate databases (e.g. configuration management databases) that include detailed system catalog of the computing devices under their management. Further, some configuration management software may enable searches on their system catalogs for identify managed devices that meet various conditions, such as, software versions, application installed, hardware components, or the like, or combinations thereof.

The term "task" as used here refers to one or more actions that may be programmatically performed on a computing device, such as, a network device and/or a client device. Tasks may be performed by executing one or more scripts and/or programs on a computing device. In some embodiments, tasks may include one or more actions for configuration management.

The term "application" as used herein refers to applications that may be arranged to provide one or more features and/or functions in a computing environment. In at least one of the various embodiments, one or more applications may be arranged to work together as part of a larger service. For example, in an e-commerce service, the shopping cart features may be considered to be one application and the catalog search features may be considered to be another application. Thus, the shopping cart application and the catalog search application may be deployed together as part of the e-commerce service. Further, in some case, an application as used herein may be module or library that may be used by one or more other applications. Accordingly, an application for the purposes of the innovations described herein is not required to be an executable process.

The term "service" as used herein, is the general term for service that is made available to users. In some embodiments, a service may be comprised of multiple applications, where each application may contribute one or more features to the service as a whole.

The term "live computing environment" as used herein refers to the computing environment where one or more applications are operative in a live production deployment. The live environment is the actual computing environment that is exposed to the (public or private) consumers of the applications. A live computing environment may include one or more computer and/or servers providing different features or services, such as, database servers, web servers, LDAP servers, load balancers, firewalls, switches, routers, or the like.

A live computing environment may be comprised of one or more computers, such as, network computers, virtualized computers, virtual machines, or the like. Further, a live computing environment may be arranged to operate in one or more cloud-based environments, distributed clusters, or the like.

The term "union computing environment" as used herein refers a computing environment that is arranged to be as similar to a corresponding live computing environment as practical. This includes arranging the configuration, operating system, other application versions, hardware drivers, peripheral devices, network configuration, or the like, to match the live computing environment. In particular embodiments, the closeness of match may vary depending on the cost and difficulty of duplicating the live computing environment, as well as, the requirements of the user. In ideal circumstances the union computing environment will be a clone of the live computing environment.

The term "rehearsal computing environment" as used herein refers to a computing environment that is a clone of the union environment, or as close to a clone as possible.

The term "change information" as used herein refers to information corresponding to changes made by a software developer or configuration manager to an application or its operative environment. In some embodiments, change information may include source code changes made by a software developer. In other embodiments, change information may include changes to network configuration, database schemas, stored procedures, make files, firewall rules, user information, or the like. Change information may include information related to more than one change. For example, change information may include changes generated by multiple software developers. However, during the delivery process the changes included the change information being delivered are treated atomically. The entire change information must either be delivered or rejected.

The term "smoke test" as used herein refers to an automatic test that may be used to quickly test an application. A smoke test may be arranged to test basic functionality of the application to reveal failures that may be severe enough to reject a prospective change. A smoke tests may include test cases that cover the most important functionality of an application to ascertain if the most crucial function of a program work correctly. Smoke tests may be performed using one or more scripts or programs for software test harnesses, standalone scripts or programs, or the like.

The term "functional test" as used herein refers to an automatic test that may be used to test all or most of the functions of an application. Functional test may be designed to receive inputs and/or generate outputs. Functional testing may be end-to-end testing of every known feature of the application. Functional tests may be performed using one or more scripts or programs for software test harnesses, standalone scripts or programs, or the like.

The term "repository" as used herein refers to data stores for storing source code, configuration files, media assets, or the like, for one or more applications. In some embodiments, a repository may be a source control system offering one or more well-known feature, such as, version control, branching, tagging, check-ins/check-out, change notifications, change management, or the like.

The term "delivery pipeline" as used herein refers to a configured continuous delivery pipeline that comprised one more defined stages each with one or more defined phases. Change information may progress through a delivery pipeline until it reaches and completes that final stage corresponding to deployment and operating on a live computing environment. Each phase for each stage must be successfully completed to advance through the delivery pipeline.

Briefly stated, various embodiments are directed towards managing application delivery over a network. In at least one of the various embodiments, change information that may correspond to one or more changes to an application may be provided and/or released to a delivery pipeline. In at least one of the various embodiment, the delivery pipeline, may also include, multiple stages, including at least a verify stage, a review stage, an acceptance testing phase, a union stage, a rehearsal stage, and a live stage, wherein each stage includes one or more phases that include at least one operation that is affirmatively passed prior to moving to the next stage in the deliver pipeline.

In at least one of the various embodiments, the change information may be verified in part based on a static analysis of the content of the change information. Also, one or more unit tests may be executed. In at least one of the various embodiments, verifying the change information, may also include compiling a portion of software source code that corresponds to the change information.

In at least one of the various embodiments, if the change information may be affirmatively verified, one or more reviewers may be notified to approve the change information. If the number of reviewers that approve the change information at least meets a threshold number, the change information may be approved. And, if any reviewer disapproves of the change information, the change information may be rejected. The number of reviewers and their responsibility for reviewing may be based on one or more review policies.

In at least one of the various embodiments, a new version of the application that includes the change information may be generated. In at least one of the various embodiment, generating the new version of the application may further include generating one or more build artifacts for installing the new version of application on one or more computing environments.

In at least one of the various embodiments, at an acceptance stage, acceptance testing may be performed on new the version of the application. In at least one of the various embodiments, acceptance testing may also include provisioning computing resources that may be associated with the new version of the application in an acceptance computing environment.

Also, in at least one of the various embodiments, acceptance testing may include deploying the version of application that includes the change information into the acceptance computing environment.

In at least one of the various embodiments, if the result of the acceptance testing is affirmative, a shipping operation may be enabled in the delivery pipeline for shipping the new version of the application, such that the delivery pipeline may be paused until activation of the enabled shipping operation may be approved by an authorized user.

In at least one of the various embodiments, upon activation of the shipping operation, the delivery pipeline may be unpaused and the new version of the application may be deployed on one or more computing environments.

In at least one of the various embodiments, if the new version of the application fails on the at least one computing environment, a subsequent revised version of the application may be deployed on another computing environment that may be separate from the at least one computing environment.

In at least one of the various embodiments, if any testing in the delivery pipeline generates a negative result, the change information may be rejected and removed from the delivery pipeline.

Illustrative Operating Environment

FIG. 1 shows components of one embodiment of an environment in which Embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, Delivery Management Server Computer 116, Union Environment Server Computer 118, Rehearsal Environment Server Computer 120, Live Environment Server Computer 122, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computer 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computers 103, mobile computer 104, tablet computers 105, or the like. However, portable computers are not so limited and may also include other portable computer such as cellular telephones, display pagers, radio frequency (RF) devices, infrared (IR) devices, Personal Digital assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display And send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, delivery management server computer 116, or other computers.

Client computers 102-105 may further be configured to include a client application that enables an end-user to log into an end-user account that may be managed by another computer, such as delivery management server computer 116, union environment server computer 118, rehearsal environment server computer 120, live environment server computer 122, or the like. Such an end-user account, in one non-limiting example, may be configured to enable the end-user to manage one of more online activities, including in one non-limiting example, project management, software development, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routes, and the like connected to wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such, as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, cloud network, cloud instance, or the like.

Network 110 is configured to couple network computers with other computers, including, delivery management server computer 116, union environment server computer 118, rehearsal environment server computer 120, live environment server computer 122, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections such as through a universal serial bus (USB) port, other forms of computer-readable media, or any combination thereof. On an interconnected set of LANs, including those based on differing architectures and protocols, a router acts as a link between LANs, enabling messages to be sent from one to another, In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, of the like. Furthermore, remote computers and other related electronic devices could he remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of delivery management server computer 116 is described in more detail below in conjunction with FIG. 3. Briefly, however, delivery management server computer 116 includes virtually any network computer capable of managing the continuous delivery of one or more applications or services.

Although FIG. 1 illustrates delivery management server computer 116, union environment server computer 118, rehearsal environment server computer 120, and live environment server computer 122 each as a single computer, the innovations and/or embodiments are not so limited. For example, one or more functions of delivery management server computer 116, union environment server computer 118, rehearsal environment server computer 120, live environment server computer 122, or the like, may be distributed across one or more distinct network computers. Moreover, delivery management server computer 116, union environment server computer 118, rehearsal environment server computer 120, live environment server computer 122 are not limited to a particular configuration such as the one shown in FIG. 1. Thus, in one embodiment, delivery management server computer 116, union environment server computer 118, rehearsal environment server computer 120, or live environment server computer 122 may be implemented using a plurality of network computers. In other embodiments, the each server computer may operate as a plurality of network computers within a cluster architecture, a peer-to-peer architecture, or the like. Further, in at least one of the various embodiments, delivery management server computer 116, union environment server computer 118, rehearsal environment server computer 120, or live environment server computer 122 may be implemented using one or more cloud instances in one or more cloud networks.

According, these innovations and embodiments are not to be construed as being limited to a single environment, and other configurations, and architectures are also envisaged.

Illustrative Client Computer

Figure 2:
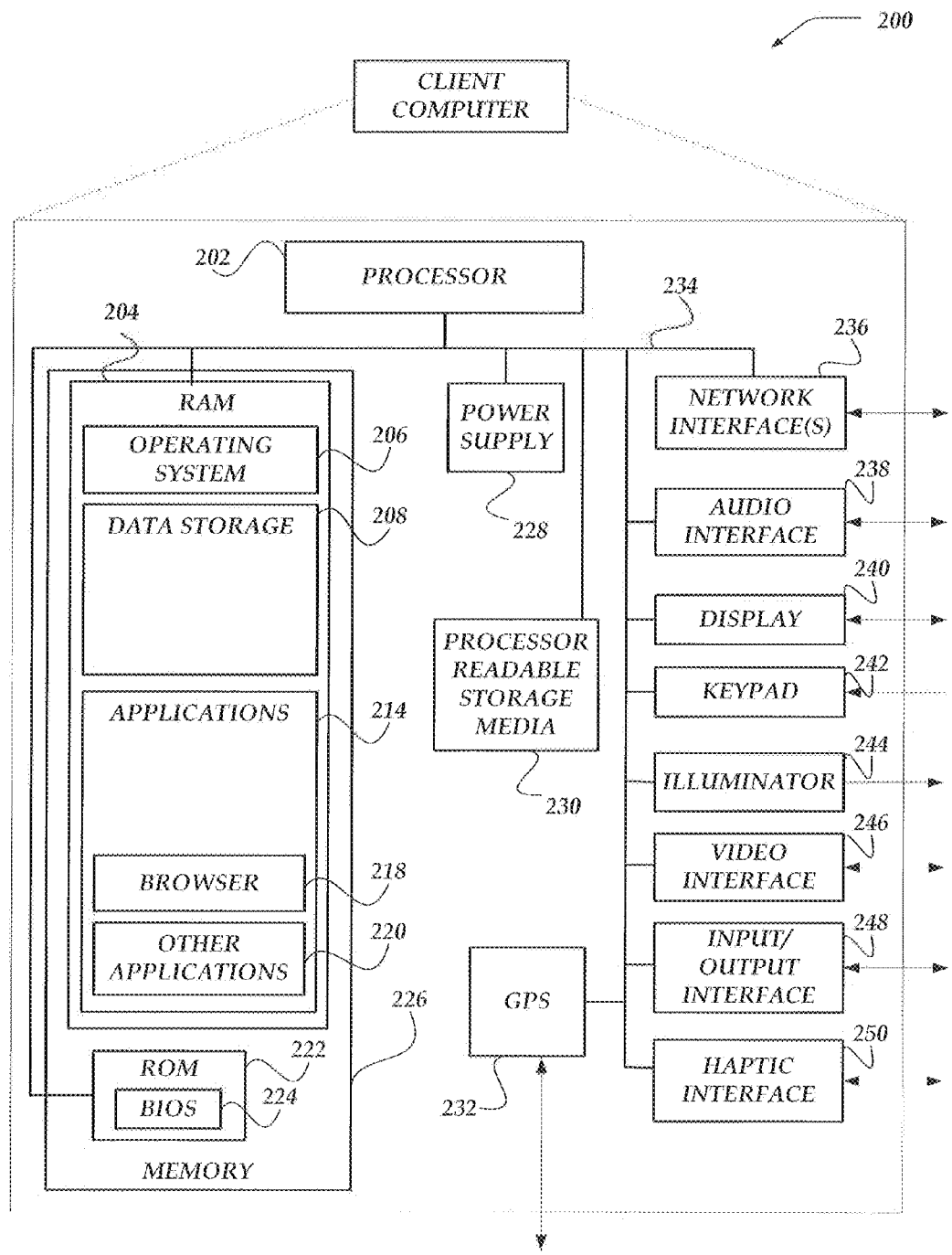
FIG. 2 shows a logical schematic embodiment of a client computer.

FIG. 2 snows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248 a haptic interface 250, and a global positioning system (GPS) receiver 232.

Power supply 228 provides power to client computer 200. A rechargeable or non-rechargeable Battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control Protocol/Internet protocol (TCP/IP), short message service (SMS), WAP, ultra wide band (UWB), IEEE 802.16 Worldwide Interoperability for Microwave Access (WiMax), session initiated protocol/realtime transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of A human voice. For example. audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand. keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 way be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light, Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client Computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within mil-limeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information ray then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Application 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220.

Browser 218 may include virtually any application configured to receive and display graphics, text, multimedia, messages, and the like, employing virtually any web based language. In one embodiment, the browser application is enabled to employ HDML, WML, WMLScript, Java script, SGML, HTML, XML, and the like, to display and send a message. However, any of a variety of other web-based programming languages may be employed. In one embodiment, browser 218 may enable a user of client computer 200 to communicate with another network computer, such as delivery management server computer 116 shown in FIG. 1.

Other applications 220 may include, but are not limited to, calendars, search programs, email client, IM applications, SMS application, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
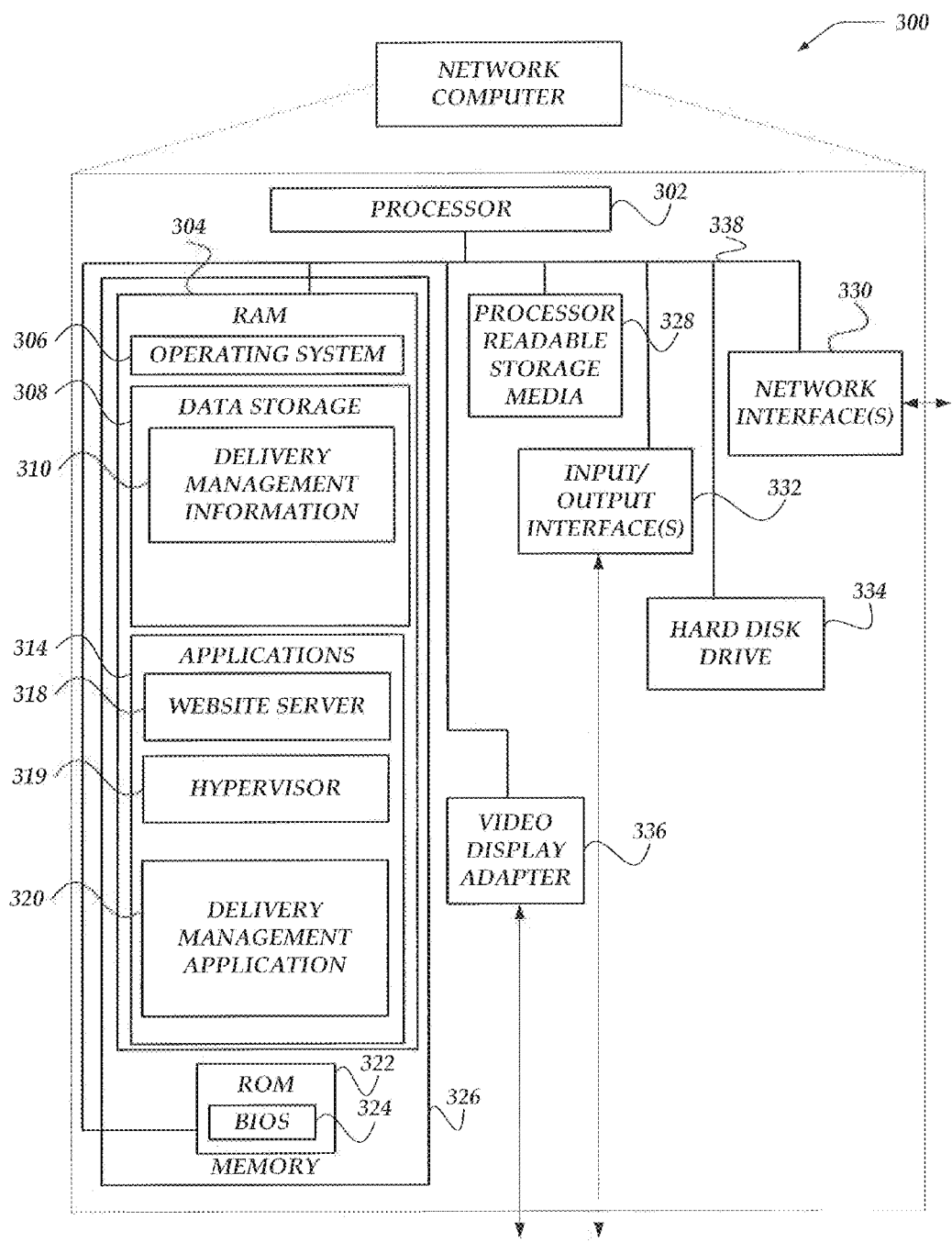
FIG. 3 illustrates a logical schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example delivery management server computer 116, and/or other network computers, such as, computers comprising, union environment server computer 118, rehearsal environment server computer 120, or live environment server computer 122.

Network computer 300 includes processor 302, processor readable storage media 328, network interface unit 330, an input/output interface 332, hard disk drive 334, video display adapter 336, and memory 326, all in communication with each other via bus 338. In some embodiments processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology. CD-ROM, digital versatile disks (DVD) or other optical storage, magnetic cassettes, magnetic tape, magnetic disk storage or other magnetic storage devices, of any other media which can be used to store the desired information and which can be accessed by a computer.

Memory 326 further includes one of more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may he configured to maintain and store use account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include delivery management information 310. In at least one of the various embodiments, delivery management information 310 may include information, such as, change status/status, source code repositories, test information acceptance criteria, acceptance policies, user profiles, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS servers, IM message servers, email servers, account managers, and so forth. Applications 314 may also include website server 318, hypervisor 319, or delivery management application 320.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Logical Architecture

In at least one of the various embodiments, a vertically integrated continuous application Delivery system may be arranged for controlling and managing processes and/or actions that may be performed if a change may be introduced to an application. In some embodiments, the applications may be working together with one or more applications to provide a service for public or private users. Accordingly, defects introduced by changes made to one application may have the potential to impact other applications that may be used in the service.

Figure 4:
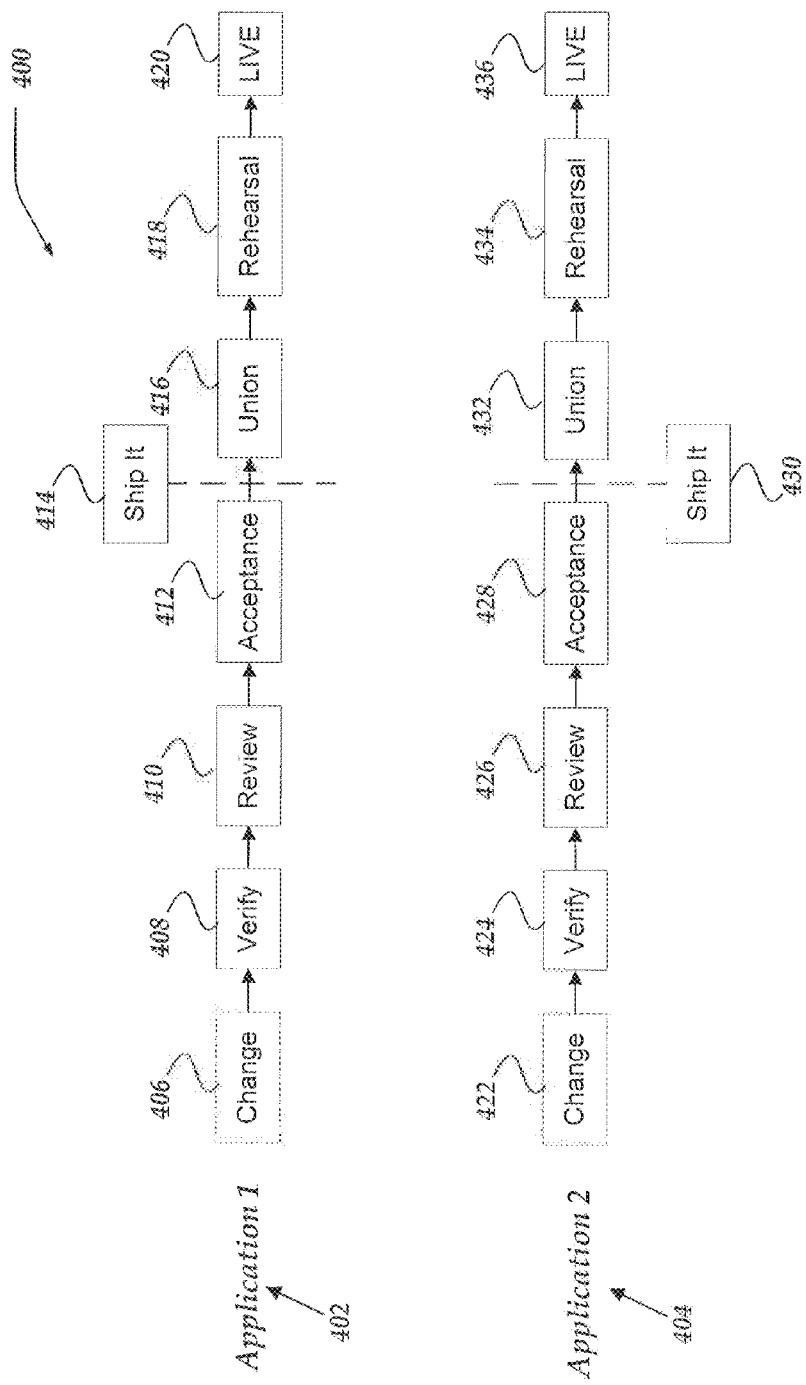
FIG. 4 illustrates a portion of a logical architecture for vertically integrated continuous delivery of an application in accordance with at least one of the various embodiments.

FIG. 4 shows for system 400 that is a logical architecture for vertically integrated continuously delivery of an application, in accordance with at least one of the various embodiments. In at least one of the various embodiments, the delivery process may be arranged into multiple states with each phase comprising multiple phases. In at least one of the various embodiments, each distinct application for a service may be associated with a corresponding delivery pipeline.

In at least one of the various embodiments, changes introduced to an application may be processed through a continuous delivery pipeline comprising defined stages. In order for a change to reach the live computing environment it must successfully pass each stage of the delivery pipeline. If a change fails a stage it may be rejected. Rejected changes are removed from the delivery pipeline. Accordingly, the change may be provided to the continuous delivery pipeline again, starting over at the first stage if the pipeline.

In at least one of the various embodiments, application 402 (Application 1) may be associated with a delivery pipeline that includes multiple stages, such as, change stage 406, verify stage 408, review stage 410, acceptance stage 412, shipping operation 414, union stage 416, rehearsal stage 418, live stage 420, or the like. Similarly, in at least one of the various embodiments, application 404 (Application 2) may be associated with a different delivery pipeline that includes that same stages as the delivery pipeline associated with application 402. Such as, change stage 422, verify stage 424, review stage 426, acceptance stage 428, shipping operation 430, union stage 432, rehearsal stage 434, live stage 436, or the like.

In at least one of the various embodiments, each stage of pipeline may represent specific steps in the process of delivering changes to an application to a live computing environment. Further, each stage of a delivery pipeline may include one or more phases that may be appropriate to a particular stage.

In at least one of the various embodiments, specific stages and the corresponding phases may be fixed and/or otherwise unalterable. However, in at least one of the various embodiments, the operational details for the tasks, tests, or conditions that correspond to any particular phase of a stage may vary depending on the requirements associated with a particular application.

For example, in at least one of the various embodiments, a verify stage may include a compile phase, in this case, the actions taken during the compile phase may vary depending on the type of change and/or type of project. Thus, if the changes involve source code that need to be compiled with a C compiler, instructions may be defined in the phase automatically compile the source code with the appropriate C compiler. Likewise, if the source code is Java, different instructions may be required to compile the java source code.

Nevertheless, in at least one of the various embodiments, each continuous delivery pipeline may be arranged include the same stages, with each stage having the same phases.

In at least one of the various embodiments, the change stage, such as, change stage 406 may be considered an optional or pseudo stage since it may represent the action of determining the one or more changes should be released to the continuous delivery pipeline. For example, software developers may implement changes for new features or to repair defects for an application. At some point, the changes may be determined to be ready to be released to the delivery pipeline. At this point one or changes may be bundled, named, tagged, or otherwise, included into change information that may be released to the continuous delivery pipeline.

In at least one of the various embodiments, the verify stage, such as, verify stage 408, may include one of more phases, such as, compile, static code analysis, perform unit tests, or the like. The review stage, such as review stage 410, may include one or more phases, such as, notification of reviewers, wait of reviews, or the like. The acceptance testing stage, such as, acceptance stage 412, may include one or more phases, such as, merging changed code into a target branch, building, provisioning, deploying, smoke testing, functional testing, the like.

In at least one of the various embodiments, if the acceptance testing stage is successful, the delivery management application may be arranged to enable a shipping operation to be enabled for activated such as, shipping operation 414. The delivery management server may enable a shipping operation to be activated by a user rather than automatically moving the changes further down the delivery pipeline.

In at least one of the various embodiments, if an authorized user approves and/or activates an enabled shipping operation, such as, shipping operation 414, the delivery pipeline may be advanced to the union stage, such as union stage 416. In at least one of the various embodiments, the union stage may include one or more phases, such as, provisioning, deploying, smoke testing, functional testing, or the like. Next, a rehearsal stage, such as, rehearsal stage 418 generally includes phases that may be the same or similar to the phases included in the union stage, if the rehearsal stage succeeds without error, the changes may be advanced to the live stage, such as, live stage 420. During the live stage, phases similar to the rehearsal stage may be executed, such as, provisioning, deploying, smoke testing, and functional testing, albeit they may include different tests since at the live stage the changes and the testing may occur in a live computing environment. Accordingly, some functional tests may be inappropriate and/or unsafe to execute in the live computing environment.

In at least one of the various embodiments, if the union stage is performed without error, all acceptance environments are updated with the current changes. Accordingly, at this point the changes are becoming part of the service enabling, and/or requiring other applications to integrate with during the acceptance stage going forward. For example, if changes for Application 1 include a database schema change, such as, adding column to a database table, after the change successfully passes through the union stage every other application that is part of the service will have to adapt to the database schema change (if applicable) before they can release new changes. In other words, after a change has made it past the union stage it becomes part of the service, and/or service code base forcing other applications to integrate with those changes as necessary.

Figure 5:
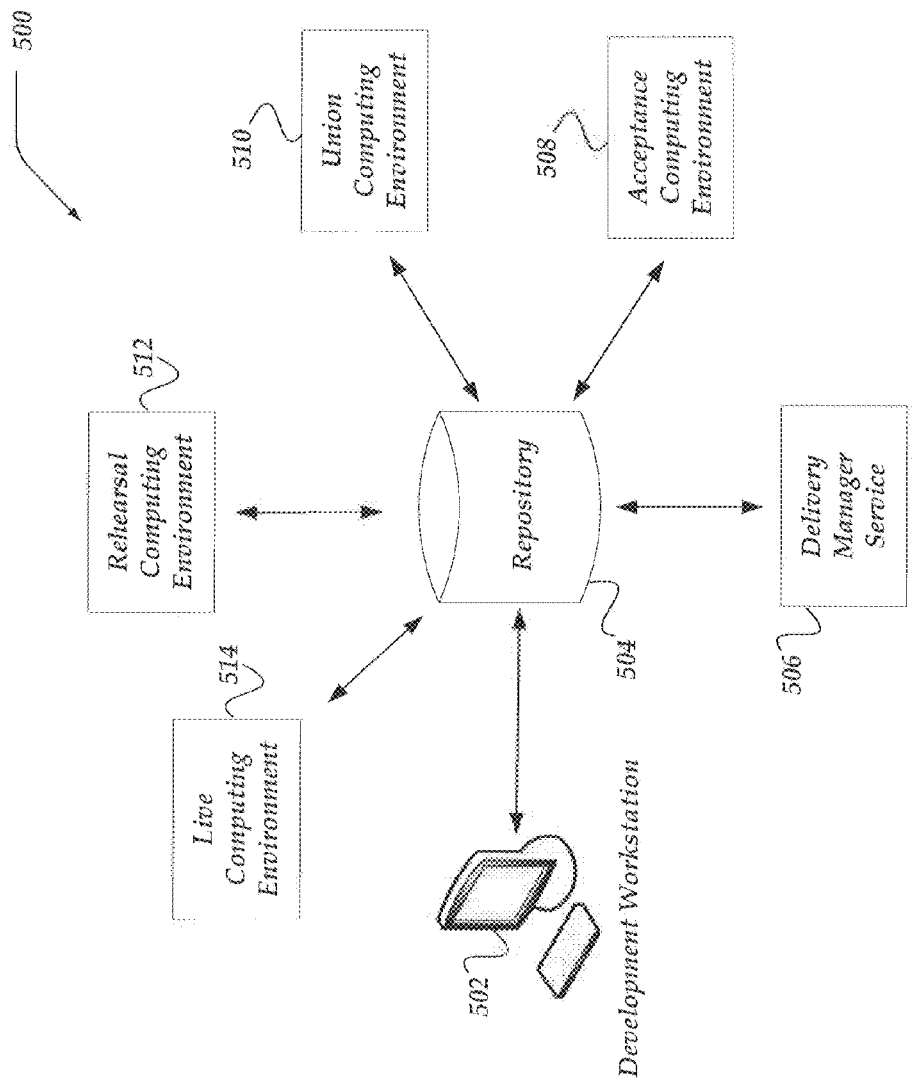
FIG. 5 illustrates a portion of a system environment for vertically integrated continuous delivery of an application in accordance with at least one of the various embodiments.

FIG. 5 illustrates a logical schematic of system 500 for continuous delivery of an application in accordance with at least one of the various embodiments. In at least one of the various embodiments, one or more software developers, represented by development workstation 502, may introduce one or more changes to an application in the form of change information. In At least one of the various embodiments, change information may be stored in a repository, such as, repository 504. In at least one of the various embodiments, repository 504 may be a data store that includes source code, configuration scripts, media assets (e.g., images, sounds, video, or the like), resource files or the like, for an application. In practice a repository may include information and data for multiple applications or services, but information for each application may be kept separate and distinct using one or more well-known software source control/version control/ project management techniques.

In at least one of the various embodiments, delivery service manager 506 may be comprised of a delivery management application, such as, delivery management application 320 that may be operative on one or more network computer, such as, network computer 300. Delivery management service 506 may be arranged to manage advancement of the change information submitted through development workstation 502 as it move through the continuous delivery pipeline.

In at least one of the various embodiments, acceptance computing environment 508 may be comprised of ton or more network computer arranged be operative to support acceptance testing related the change information. Also, in at least one of the various embodiment, union computing environment 501 may be a computing environment that includes one or more computer, network computers, networks, application, operating systems, or the like. Union computing environments may be arranged to be similar to live computing environment 514. Likewise, in at least one of the various embodiments, rehearsal computing environment 512, may be arranged to be a clone, or otherwise, very similar to union computing environment 510. And, live computing environment 514 may represent the computing environment that actually hosting the live/production version of the applications that comprise the service.

In at least one of the various embodiments, the actual number of computers and/or type of computers as well as their arrangement and configuration will vary depending on the specific needs of the particular service and/or it application. for example, in at least one of the various embodiments, computing environments may be comprised a cloud computing environment, one or more local computer, distributed network computers, or the like, or combination thereof. Likewise, in at least one of the various embodiments, each of the parts of system 500 may be arranged to communicate over one or more private or public networks, such as, network 108, network 110, or the like. expose an API such as a REST tracking the state of the various delivery pipeline and for responding to queries and/or status updates for the various delivery pipelines.

Generalized Operation

FIGS. 6-10 represent the generalized operation for vertically integrated continuous delivery of an application in accordance with at least one of the various embodiments. In at least one of the various embodiments, processes 600, 700, 800, 900, and 1000 described in conjunction with FIGS. 6-10 may be implemented by and/or executed on a single network computer, such as network computer 300 of FIG. 3. In other embodiments, these processes portions of process thereof may be implemented by and/or executed on a plurality of network computer, such as network computer 300 of FIG. 3. In yet other embodiments, these processes or portions thereof may be implemented by and/or executed on one or more virtualized computer, such as, those in a cloud-based environment. However, embodiments are not so limited and various combinations of network computers, client computers, or the may be, utilized. Further, in at least one of the various embodiments, the processes described in conjunction with FIGS. 6-10 may be operative in continuous delivery architectures such as those described in conjunction with FIGS. 4 and 5.

Figure 6:
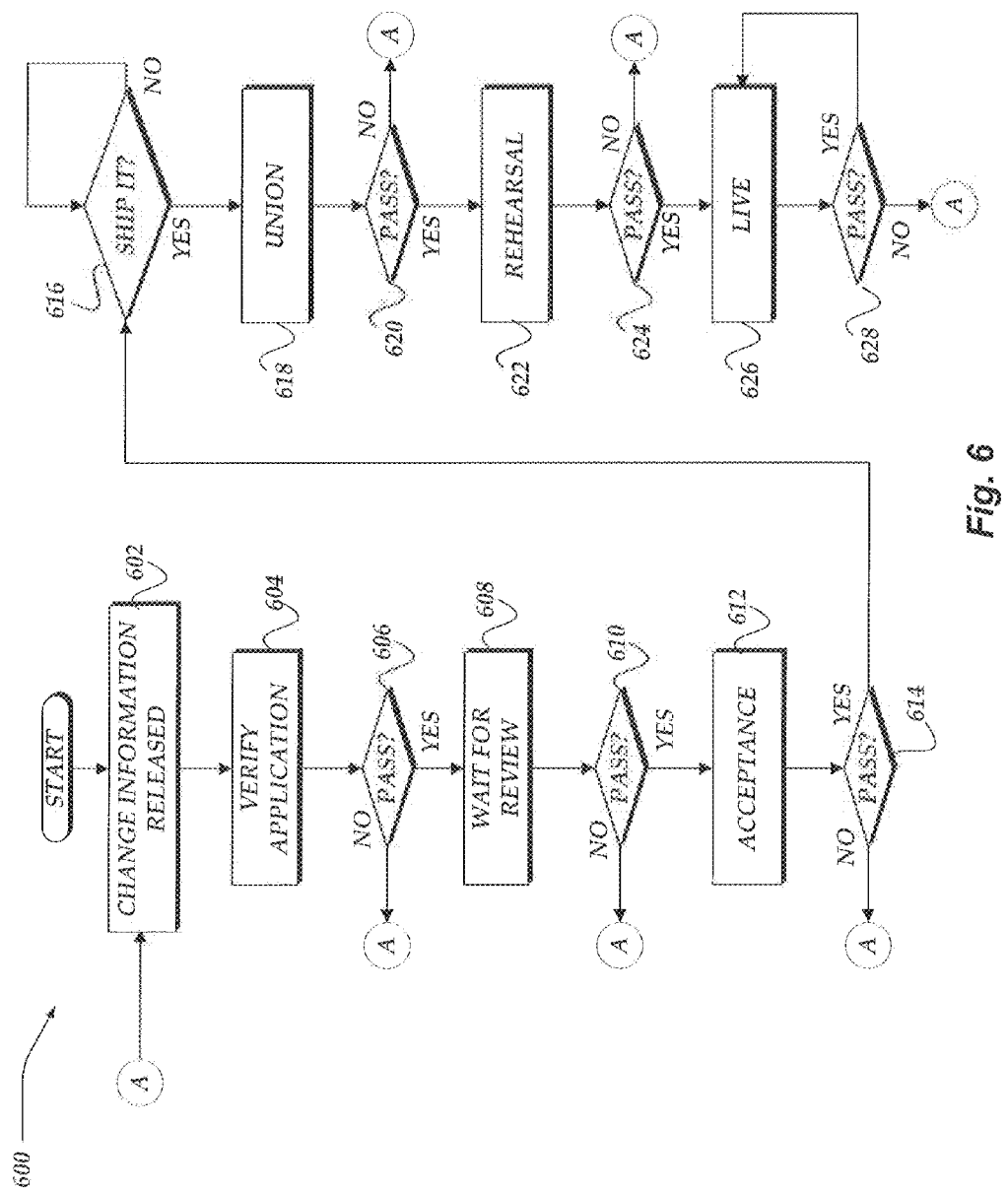
FIG. 6 shows an overview flowchart for a process for vertically integrated continuous delivery of an application with at least one of the various embodiments.

FIG. 6 shows an overview flowchart for process 600 for running jobs in accordance with at least one of the various embodiments, After a start block, at block 602, in at least one of the various embodiments, change information may be released into continuously delivery pipeline. In at least one of the various embodiments, developers, or other users, may designate that one or more changes may be associated together as change information that may be intended for release to the live service. Change information may comprise source code files, media files. scripts, configuration information, or the like.

At block 604, in at least one of the various embodiments, the change information may enter the verify stage. In at least one of the various embodiments, if the change information is in the verify stage one or more phases may be executed for the application and the change information. See, FIG. 7 and its accompanying description.

At decision block 606, in at least one of the various embodiments, if each of the verification phases are passed and/or the conditions have been met, control may flow block 608; otherwise the change information is rejected, and control flows back to the beginning of the continuous delivery pipeline.

In at least one of the various embodiments, change information that fails to successfully pass a phase is rejected and pulled out of the continuous delivery pipeline. Thus, in at least one of the various embodiments, the owners (e.g., software developers) may resolve any issues or defects that caused the changes to be rejected and resubmit the change information to the delivery pipeline.

At block 608, in at least one of the various embodiments, the change information enters the review stage. In at least one of the various embodiments, the change information may remain in this stage until it is approved or disapproved by one or more designated reviewers. See, FIG. 8.

At decision block 610, in at least one of the various embodiments, if the change information is approved by its reviewers, control may flow to block 612; otherwise, the change information is rejected and control may flow back to block 602.

At block 612, in at least one of the various embodiments, the change information enters the acceptance testing stage of the continuous delivery pipeline. In at least one of the various embodiments, at this stage the since the change information passed the verify stage and the review stage the change information may be merged into the main branch of the source code. Here, one or more phases associated with the acceptance stage may be executed. See, FIG. 9.

At decision block 614, in at least one of the various embodiments, if the acceptance testing is passed, control may flow decision block 616; otherwise, the change information is rejected and control may flow back to block 602.

At decision block 616, in at least one of the various embodiments, the change information has entered a ready-to-ship state, where an authorized user may signify that the change information should be released to the live environment. In at least one of the various embodiments, the authorized user may initiate a shipping operation by providing input through a user-interface. In at least one of the various embodiments, process 600 may remain at decision block 616 until a user authorizes the shipping operation. If an authorized user initiates and/or approves a shipping operation, control may flow to block 618; otherwise, control may remain at decision block 616.

At block 618, in at least one of the various embodiments, the change information at the union stage of the continuous delivery pipeline. Here, one or more phases associated with the union stage may be executed. See, FIG. 10.

At decision block 620, in at least one of the various embodiments, if the tests and/or Conditions corresponding to the union stage are passed, control may flow to block 622; otherwise, the change information is rejected and control may flow back to block 602.

Also, in at least one of the various embodiments, if the tests and/or condition corresponding to the union stage are met, a current version of the application that includes the change information is provided to all acceptance environments. Accordingly, all future changes will have to integrate with a version of the application that includes the change information to pass the acceptance stages. At this point the change information may be considered to be part of the application, even though it has not been released to the live computing environment.

At block 622, in at least one of the various embodiments, the change information is at the rehearsal stage of the continuous delivery pipeline. Here, one or more phases associated with the rehearsal stage may be executed. See, FIG. 10.

At decision block 624 in at least one of the various embodiments, if the tests and/or conditions corresponding to the rehearsal stage are passed, control may flow to block 626; otherwise, the change information is rejected and control may flow back to block 602.

At block 626, in at least one of the various embodiments, the change information is in the live stage. The live stage may include one or more phases of testing and condition check as the change information is released to the live/public computing environment. In at least one of the various embodiments, there may be ongoing monitoring and/or testing as the service continues to operate. See, FIG. 10.

At decision block 628, in at least one of the various embodiments, if the operation of the live service continues to pass operational testing and otherwise continues to operate as expected, control may loop back to block 626; otherwise, if and error or test failure may be attributed to the change information, control may loop back to block 602.

Figure 7:
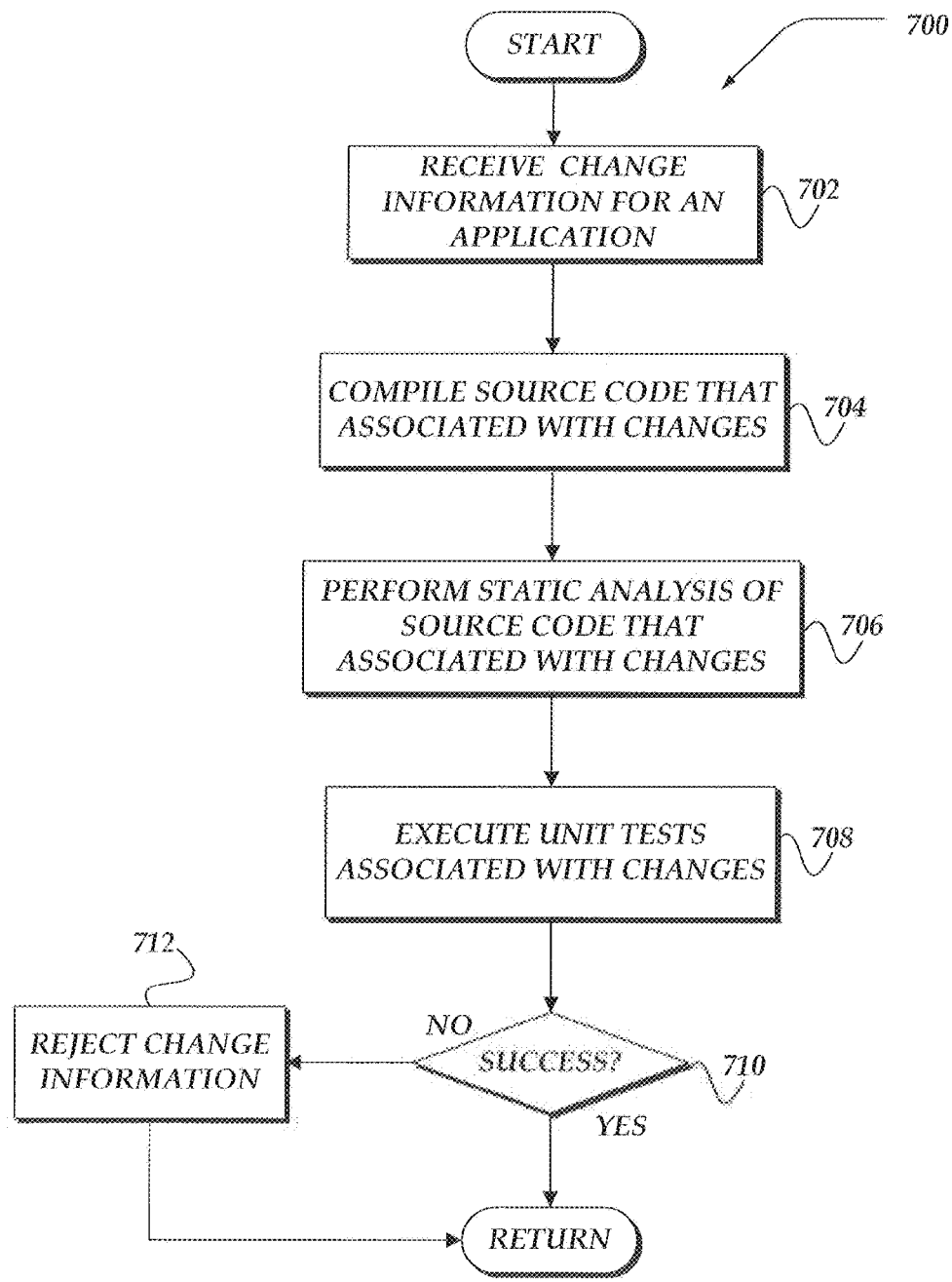
FIG. 7 shows an overview flowchart for a process for verification of change information in accordance with at least one of the various embodiments.

FIG. 7 shows an overview flowchart for process 700 for verification of change information in accordance with at least one of the various embodiments. After a start block, at block 702, change information may be provided for an application. In at least one of the various embodiments, the changes comprising the change information may be associated together using one or more well-known methods consistent with source control/version control systems. For example, changes may be listed, indexed, bundled, named, tagged, or otherwise, indicated using the features of a source control system. Further, in at least one of the various embodiments, the delivery management application may be arranged to enable changes to listed, indexed, bundled, named, tagged, or otherwise, indicated absent a source control system.

Accordingly, the delivery management application may be arranged to use one or more well-known data structures to associate the change information with a current delivery stage and phase. For example, in at least one of the various embodiments, a data structure may include an identifier for the change information and values for indicating the current stage and/or phase in the delivery pipeline. Further, the delivery management application may be arranged to concurrently store such data structures for multiple applications. Accordingly, in at least one of the various embodiments, change information for multiple applications in a service may be progressing through the delivery pipeline at the same time.

At block 704, the source code and/or source documents, if any, that may be correspond to changes included in the change information, may be retrieved and compiled. In at least one of the various embodiments, in some cases, change information may include source code that may be subject to compiling to object code, byte code, or the like. The delivery management application may be arranged to enable the automatic compilation such source code and determine if the source code compiled successfully. In at least one of the various embodiments, the development management application may be arranged to compile the entire application associated with the change information.

In at least one of the various embodiments, the change information may include instructions for compiling the application for verification. This may include locations of compilers, project files, make files, mapping of change information to particular compilers and/or other tools, or the like. Also, in at least one of the various embodiments, the delivery Management application may be configured to the include instructions for compiling the applications as part of its configuration information used for defining the delivery pipeline.

At block 706, one or more static analysis procedures (e.g. lint operations) may be Performed on the source code corresponding in the change information. In at least one of the various embodiments, the delivery management application may be arranged in execute one or more computer programs that are designed to analyze source code and report on unsafe and/or sub-optimal programming. Each programming language may have different static analysis programs as well as different standard for determining if source code is acceptable. Further, some static analysis programs may be configurable such the programming standards of an organization may be automatically enforced by the static analysis phase of the verification stage.

In at least one of the various embodiments, the particular static analysis procedures used by may be include in the change information, and/or configuration information for the delivery pipeline may be arranged to include instructions for which static analysis procedures should be executed for a particular application.

At block 708, one or more unit tests corresponding to the change information may be Executed. Depending on the programming environment and/or programming languages, one or more unit tests may be defined for one or more portions of the change information. In at least one of the various embodiments, a unit test harness may be integrated with the application and/or modules of the application that enable one or more predefined unit tests to be automatically executed. In at least one or the various embodiments, unit tests may be designed to return a pass/fail result. Accordingly, the delivery management application may be arranged to monitor the results of the unit testing. There may be one or more well-known unit test harnesses for various programming environments. Accordingly, the delivery management application may be arranged to integrate with these unit test harnesses using one or more well-known techniques.

At decision block 710, if all of phases in the verification stage are executed and pass Without failure, control may be returned to a calling process; otherwise, since there has been a failure, control may move to block 712.

At block 712, in at least one of the various embodiments, since the change information has failed the verify stage it is rejected. In at least one of the various embodiments, information that may be associated with the failure may be recorded and the appropriate users may be notified before returning control to a calling process.

In at least one of the various embodiments, process 700 may be arranged to enable the actions of one or more blocks, such as, block 704, and block 706 execute in parallel. Also, in at least one of the various embodiments, process 700 may be arranged to enable block 712 to be reached as soon as a failure or defect is detected rather than waiting until all of the phases has completed.

Figure 8:
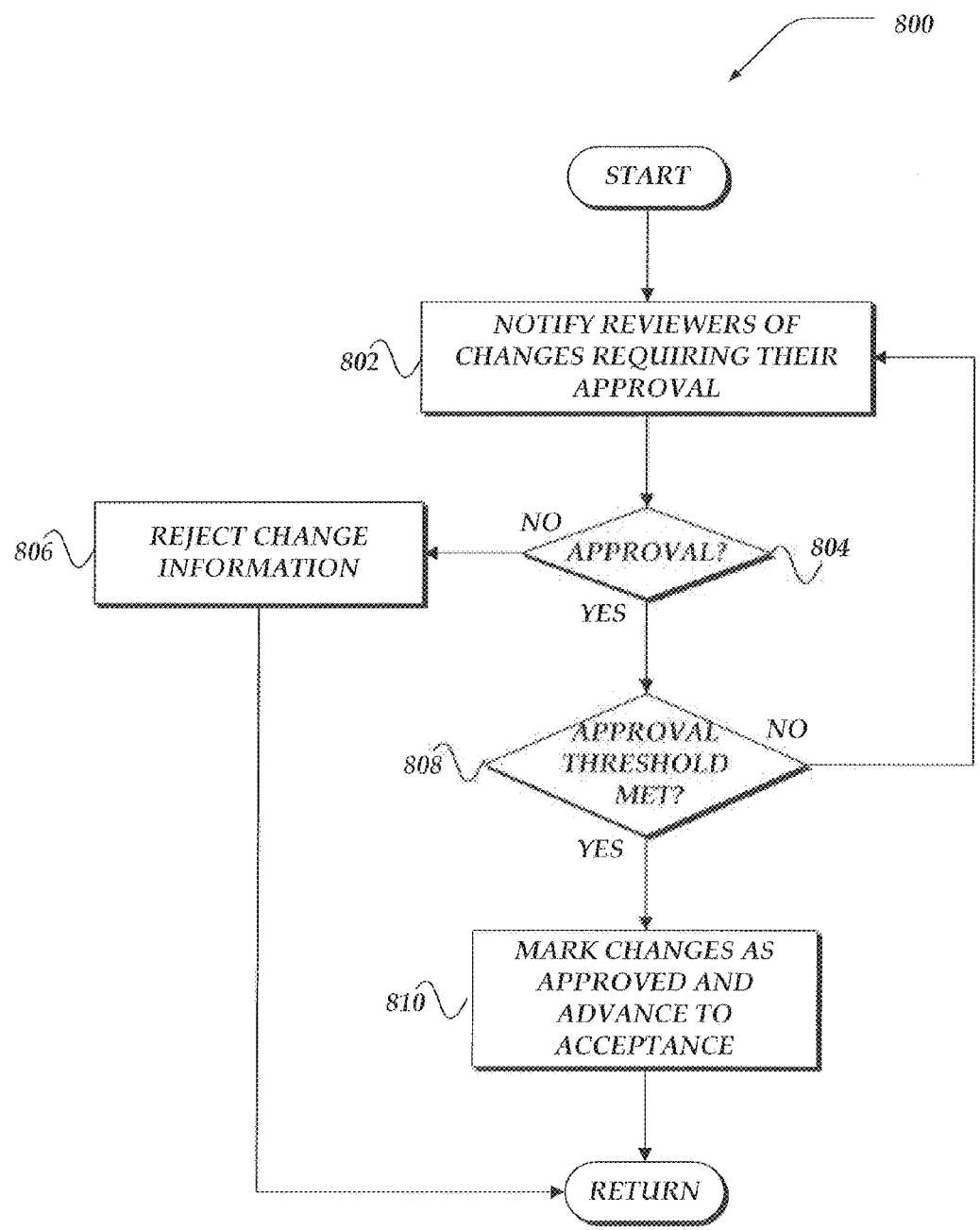
FIG. 8 shows an overview flowchart for a process for reviewing change information in accordance with at least one of the various embodiments.

FIG. 8 shows an overview flowchart for process 800 for reviewing change Information in accordance with at least one of the various embodiments. After a start block, at Block 802, one or more reviewers designated as responsible for reviewing the change information may be notified that there is change information waiting for review.

In at least one of the various embodiments, the delivery management application may be arranged to integrate with a source code review tool that enables reviewers to be assigned to various portions of the source code associated with an application.

In at least one of the various embodiments, the delivery management application may be arranged to include source code review facilities that enable one or more reviewer to be assigned one or more portions of the application source code. Accordingly, a given reviewer may be notified if the change information includes changes to source code he or she is responsible for reviewing.

At decision block 804, if one or more of the reviews approve the change information, control may flow to decision block 808; otherwise, control may flow to block 806.

In at least one of the various embodiments, as reviewers review the portions of the change information that they are responsible for they may indicate approval or disapproval. In at least one of the various embodiments, the delivery management application may monitor and record the response made by the reviewers.

At block 806, in at least one of the various embodiments, since at least a portion of the change information has failed the review stage it is rejected. In at least one of the various embodiments, if reviewer disapproves of the change information, the change information may be rejected. In at least one of the various embodiments, information that may be associated with the failure may be recorded and the appropriate users may be notified before returning control to a calling process.

At decision block 808, if the approval threshold for the change information has been met, control may flow to block 810; other control may loop back to block 802, to wait for more reviewers to approve the change information.

In at least one of the various embodiments, the delivery management application may be arranged support one or more review policies that may determine the number of reviewers required for approval. In some embodiments, multiple reviewers may be requested to review the change information but approval from less than all of them may be required for approval. For example, in at least one of the various embodiments, four reviewers may be requested to review a change, but the current review policy in effect may require two approvals to pass the review requirement. Likewise, in at least one of the various embodiments a hierarchy of reviewers may be established, such that a senior reviewer may be requested to review a change only after two lower level reviewers have approved the change, or the like. Additional review policies are envisaged and will readily be apparent to one of ordinary skill in the art. Thus, the policies described herein are at least sufficient for disclosing the present innovations.

At block 810, in at least one of the various embodiments, the change information may be marked and/or tagged as approved by reviewers enabling it to be advanced to the acceptance testing stage. Next, control may be returned to a calling process.

Figure 9:
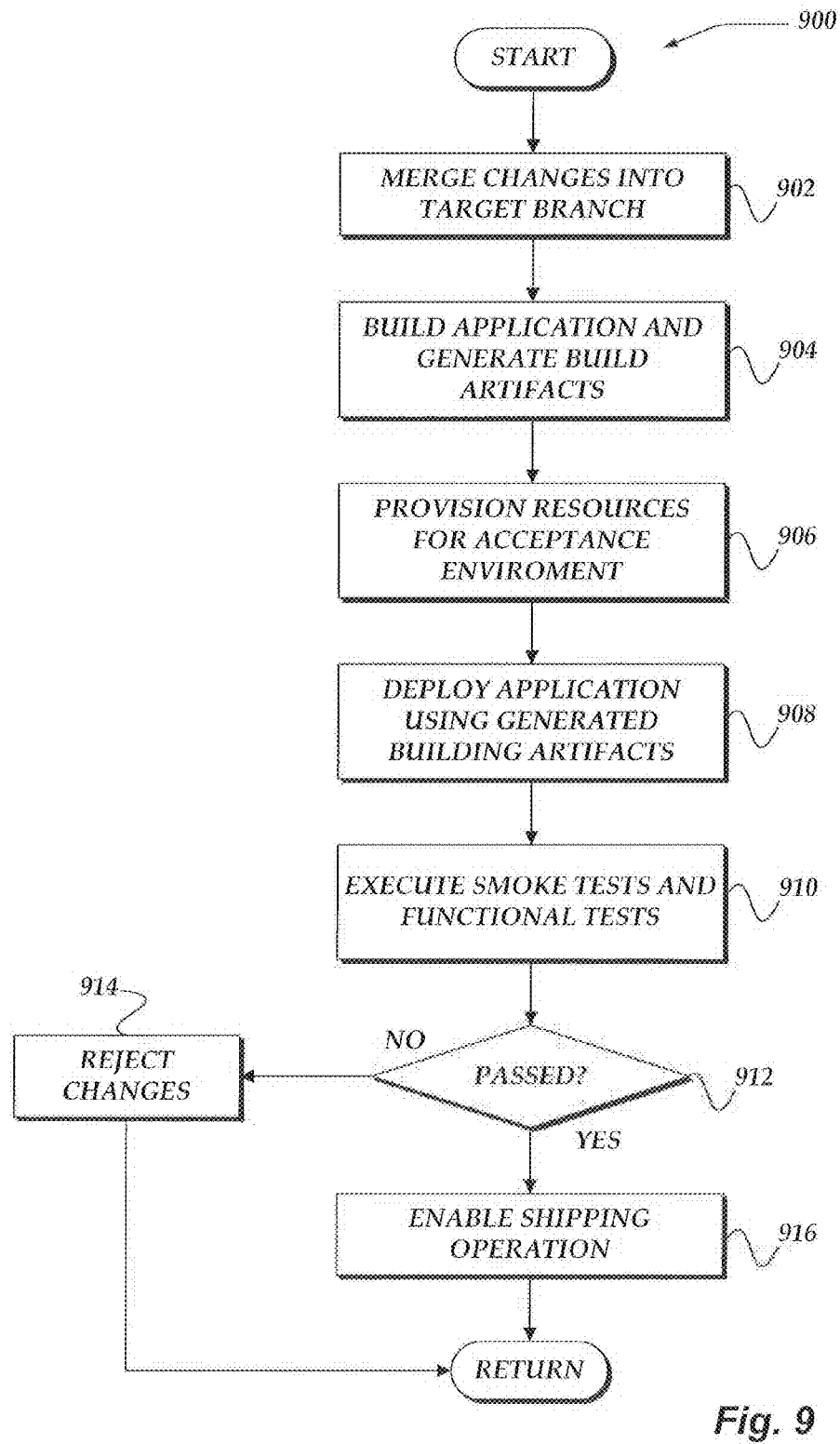
FIG. 9 shows an overview flowchart for a process for acceptance testing for change information in accordance with at least one of the various embodiments.

FIG. 9 shows an overview flowchart for process 900 for acceptance testing of change information in accordance with at least one of the various embodiments. After a start block, at block 902, in at least one of the various embodiments, the changes included in the change information may be merged into a target branch of the application in the repository.

In at least one of the various embodiments, process 900 may be arranged to employ one or more facilities of a source control system for merging some or all of the changes in the change information into a target branch for the application. In at least one of the various embodiments, a target branch may be designated and/or associated with the change information when or before it is provide to the delivery pipeline. Also, in at least one of the various embodiments, the chance information may include information for determining the target branch. For some change information, the delivery management application may be arranged to execute customized merging instructions based on one or more scripts and/or programs associated with the change information and/or the application.

At block 904, in at least one of the various embodiments, a new version of the application that includes the change information may be built or otherwise generated. Also, build artifacts sufficient or installing or deploying the new version of the application may be generated as well. Similar, to the verify stage, the change, information may be compiled and/or the application may be compiled with the change information. Further, in at least one of the various embodiments, additional build artifacts, such as, installation packages, executable programs, manual pages, help files, configuration files, or the like, may also be generated.

At block 906, in at least one of the various embodiments, resources necessary for performing acceptance testing may be provisioned. In at least one of the various embodiments, the delivery management application may be arranged to determine if the appropriate computing resources are available and provision additional resources as necessary. In at least one of the various embodiments, the resources may be provisioned in an acceptance testing computing environment that included facilities sufficient for performing acceptance testing.

For example, in at least one of the various embodiments, provisioning may include, spinning up virtual instances in a cloud environment, partitioning data storage, reformatting hard drives, reserving network addresses, or the like.

At block 908, in at least one of the various embodiments, the new version of the application may be deployed in the acceptance computing environment. In at least one of the various embodiments, the build artifacts may be copied to provisioned resources in the acceptance computing environment. Process 900 may be arranged to execute pre-defined instructions that may be included with the application, change information, configuration information, or the like, that indicate the locations and commands for automatic deploying the necessary build artifacts into the acceptance testing computing environment.

In at least one of the various embodiments, the installation packages generated during build step may be moved to the acceptance testing computing environment.

At block 910, in at least one of the various embodiments, one or more smoke tests and functional tests may be executed for the new version of the application. In at least one of the various embodiments, the application and/or the change information may include instructions that define the particular automatic testing for the smoke tests and the functional tests. In at least one of the various embodiments, the tests may be implemented using a test harness appropriate for application and/or the change information. In at least one of the various embodiments, the smoke tests and functional tests may be executed in parallel.

At decision block 912, in at least one of the various embodiments, if all of the phases of acceptance testing, as discussed above, are passed, control flow to block 916; otherwise, upon failure, control may to block 914.

At block 912, in at least one of the various embodiments, the change information may be Marked and/or tagged as having passed acceptance testing. Also, a shipping operation may be enabled for one or more authorized users. Next, control may be returned to a calling process.

At block 914, in at least one of the various embodiments, the change information may be rejected since it failed one or more phases of acceptance testing. In at least one of the various embodiments, information that may be associated with the failure may be recorded and the appropriate users may be notified before returning control to a calling process. In at least one of the various embodiments, the change information may be removed from the delivery pipeline as a consequence of being rejected.

Figure 10:
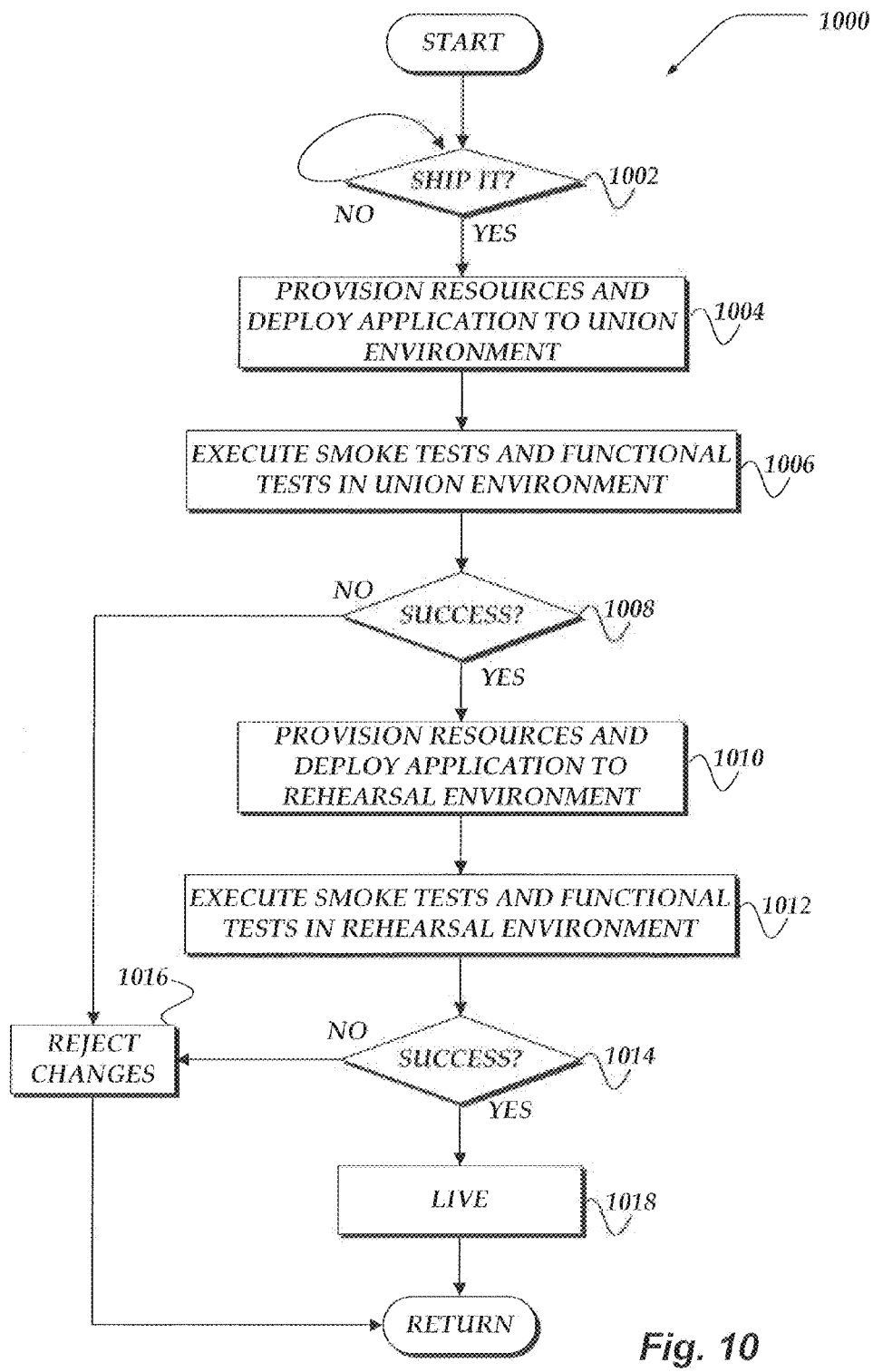
FIG. 10 shows an overview flowchart for a process for providing change information to a live environment in accordance with at least one of the various embodiments.

FIG. 10 shows an overview flowchart for process 1000 providing change information to a live environment in accordance with at least one of the various embodiments. After a start block, at decision block 1002, if an authorized user has initiated and/or approved a shipping operation, control may flow to block 1004; otherwise, control remains at decision block 1002 until an authorized user initiates or cancels the shipping operation.

In at least one of the various embodiments, the delivery management application may be arranged to enable a user interface, such as, a dashboard, that displays an activated button if the change information has passed the previous tests. In at least one of the various embodiments, if an authorized user activates the user-interface they are indicating that the delivery management application should initiate the process of deploying the change information, and/or a version of the application that includes the change information to the live computing environment.

In at least one the various embodiments, the delivery management application may be arranged to define one or more access for determining if a user may be authorized to initiate a shipping operation. The access lists may be arranged to enable particular users to ship particular applications. Also, in at least one of the various embodiments, some users may be defined as super-users such that they can initiate the shipping operation for any application.

At block 1004, in at least one of the various embodiments, the change information is in The union stage of the continuous delivery pipeline. Accordingly, in at least one of the various Embodiments, resources for the new version of the application may be provisioned on a union computing environment. Also, in at least one of the various embodiments, if resources are provisioned successfully, the new version of the application may be deployed to the union computing environment.

In at least one of the various embodiments, the provision and deployment phase of the union stage may be similar to the provision and deployment stages of the acceptance stage. The provisioning may occur on the union computing environment that associated with the application. Accordingly, in at least one of the various embodiments, the change information may include instructions for provisioning resources on the union computing environment. Likewise, in at least one of the various embodiments, the delivery management application may be arranged to include configuration information for provisioning the application resources on the union computing environment.

At block 1006, in at least one of the various embodiments, one or more smoke tests and one or more functional tests for corresponding the new version of the application may be executed within the union computing environment. In at least one of the various embodiments, the smoke tests and/or functional tests may be similar to the tests that were executed during the acceptance testing stage. However, since the union computing environment may be arranged to me more similar to the live computing environment, there may be one or more additional tests that are configured to execute within the union computing environment and not the acceptance testing computing environment.

At decision block 1008, in at least one of the various embodiments, if the phases in the Union stage are passed, control may flow to block 1010; otherwise, control may flow to block 1016. In at least one of the various embodiments, as discussed above, since the union stage has been successfully passed, the change information may be confirmed to become part of the code base of the application. Accordingly, in at least one of the various embodiments, changes included in the change information may now be available to other applications.

At block 1010, in at least one of the various embodiments, the change information has reached the rehearsal stage. In at least one of the various embodiments, rehearsal stage may include similar actions as the union stage, albeit in separate computing environment. As discussed above, the rehearsal computing environment may be a clone, or otherwise very similar to the union computing environment. Here in block 1010, steps similar to the steps performed for block 1004 may be executed. At block 1012, steps similar to the steps performed in block 1006 may be executed. At decision block 1014, if the actions performed for block 1010 and block 1012 are successful, control may flow to block 1018; otherwise control may flow to block 1016. At block 1016, in at least one of the various embodiments the change information is rejected.

At block 1018, in at least one of the various embodiments, the change information has reached the live stage. Accordingly, in at least one of the various embodiments, one or more final smoke tests may be performed before launching the new version of the application. If the final checks and/or tests are successful, the new version of the application that includes the change information is enabled to be operative on the live computing environment.

Also, in at least one of the various embodiments, there may be one or more tests that may be based on live monitoring of the live computing environment. In at least one of the various embodiments, these tests my include one or more pre-defined threshold values that exceeded generate a defect and/or error warning report. For example, the delivery management application may be arranged to generate a warning report is the CPU utilization of one or more servers exceeds a defined threshold. Additional well-known live monitoring tests are envisaged and within the scope of these innovations.

In at least one of the various embodiments, the delivery management application may be arranged that swap the roles that the union stage and the rehearsal stage perform in some situations. In at least one of the various embodiments, if the change information is rejected dining the union stage, the delivery management application may be arranged to record (e.g., in a log file, event log or the like) that the failure occurred on the union computing environment.

Accordingly, in at least one of the various embodiments, the change information may be rejected and prevented from being deployed to the live computing environment.

In response, the responsible software developers may introduce new change information in an attempt to correct the defects. If the new change information successfully passes the initial stages of the delivery pipeline (e.g., verify, review, acceptance testing) a user may again be enabled to initiate and/or approve the shipping operation. However, subsequent to a previous failure at the union stage, the delivery management application may be arranged to again execute the union stage before executing the rehearsal stage. This may enable the new version of the application to be tested in an environment that did experience the previous failure and then in an environment that did not experience the previous failure. Thus, avoiding the possibility that failure artifacts would influence the testing of the new version of the application. In at least one of the various embodiments, failure artifacts that may be avoided, include, partial configuration, left behind files, orphaned processes, open/closed network connection, or the like. Likewise, in at least one of the various embodiments, if the rehearsal stage fails, the new version of the application may first be executed in the union computing environment for testing the application in an environment that did not experience the previous failure before entering the rehearsal stage where it may tested in an environment that did experience the pervious failure. Accordingly, in at least one of the various embodiments, if the new version of the application fails on one computing environment, a subsequent revised version of the application may always be tested on a computing environment that is separate from the computing environment that experienced a previous failure.

It will be understood that figures, and combinations of actions in the flowchart-like Illustrations, can be implemented by computer program instructions. These program instructions may be provided to a processor to produce a machine, such that the instructions executing on the processor create a means for implementing the actions specified in the flowchart blocks. The computer program instruction may be executed by a processor to cause a series of operational actions to be preformed by the processor to produce a computer implemented process for implementing the actions specified in the flowchart block or blocks. These program instructions may be stored on some type of machine readable storage media, such as processor readable non-transitory storage media, or the like.

Accordingly, the illustration support combination of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware systems which perform the specified actions or steps, or combinations of special purpose hardware and computer instructions.

What is claimed as new and desired to be protected by Letters Patent of the United States is:

1. A method for managing delivery of a software application over a network using a network computer that includes a hardware processor that executes software instructions that perform actions, comprising:
   providing change information to be used in the application to a delivery pipeline;
   verifying the change information is suitable for use in the application based on at least a static analysis of the change information and at least one unit test of the change information;
   if the change information is affirmatively verified, notifying at least one reviewer to approve the change information based on at least one review policy;
   generating a new version of the application based on the change information;
   performing acceptance testing on the new version of the application, wherein the acceptance testing includes performing one or more functional tests and smoke tests on the new version of the application at a union computing environment that is similar to a live computing environment, and wherein when these one or more tests are successful, provisioning resources in a separate rehearsal computing environment that is equivalent to the union computing environment and performing further functional tests and smoke tests;
   if a result of the acceptance testing's functional tests and smoke test are affirmative, enabling a shipping operation in the delivery pipeline for the new version of the application, wherein the delivery pipeline is paused until activation of the enabled shipping operation is approved by an authorized user; and
   upon activation of the shipping operation, unpausing the delivery pipeline and deploying the new version of the application on at least one network computer in the live computing environment.

2. The method of claim 1, further comprising, if any testing in the delivery pipeline generates a negative result, perform further actions, including:
   rejecting the change information; and
   removing the change information from the delivery pipeline.

3. The method of claim 1, wherein verifying the change information, further comprises, compiling a portion of software source code associated with the change information.

4. The method of claim 1, wherein the review policy further comprises:
   if a number of reviewers that approve the change information at least meets a threshold number, approving the change information; and
   if any reviewer disapproves of the change information, rejecting the change information.

5. The method of claim 1, wherein generating the acceptance testing result, further comprises:
   merging the change information into at least a main branch of source code associated with the delivery pipeline;
   provisioning resources that are associated with the new version of the application in an acceptance computing environment; and
   deploying the new version of application to the acceptance computing environment.

6. The method of claim 1, wherein deploying the new version of the application on at least one computing environment, further comprises, if the new version of the application fails on the at least one computing environment, deploying a subsequent revised version of the application on another computing environment that is separate from the at least one computing environment.

7. The method of claim 1, wherein the delivery pipeline, further comprises a plurality of stages, including: a verify stage, a review stage, an acceptance testing phase, a union stage, a rehearsal stage, and a live stage, wherein each stage includes one or more phases that include at least one operation that is affirmatively passed prior to moving to the next stage in the delivery pipeline.

8. The method of claim 1, wherein generating the new version of the application, further comprises, generating at least one build artifact for installing the new version of the application on the at least one computing environment.

9. A system that is arranged for managing delivery of an application over a network, comprising:
    a network computer comprising:
        a transceiver that is operative to communicate over the network;
        a memory that is operative to store at least instructions; and
        a processor device that is operative to execute instructions that enable actions, including:
            providing change information to be used in the application to a delivery pipeline;
            verifying the change information is suitable for use in the application based on at least a static analysis of the change information and at least one unit test of the change information;
            if the change information is affirmatively verified, notifying at least one reviewer to approve the change information based on at least one review policy;
            generating a new version of the application based on the change information;
            performing acceptance testing on the new version of the application, wherein the acceptance testing includes performing one or more functional tests and smoke tests on the new version of the application at a union computing environment that is similar to a live computing environment, and wherein when these one or more tests are successful, provisioning resources in a separate rehearsal computing environment that is equivalent to the union computing environment and performing further functional tests and smoke tests;
            if a result of the acceptance testing is affirmative, enabling a shipping operation in the delivery pipeline for the new version of the application, wherein the delivery pipeline is paused until activation of the enabled shipping operation is approved by an authorized user; and
            upon activation of the shipping operation, unpausing the delivery pipeline and deploying the new version of the application on at least one network computer in the live computing environment; and
    a client computer, comprising:
        a transceiver that is operative to communicate over the network;
        a memory that is operative to store at least instructions; and
        a processor device that is operative to execute instructions that enable actions, including:
            providing the change information to the network computer.

10. The system of claim 9, wherein the network computer processor device is operative to enable actions, further comprising, if any testing in the delivery pipeline generates a negative result, perform further actions, including:
    rejecting the change information; and
    removing the change information from the delivery pipeline.

11. The system of claim 9, wherein verifying the change information, further comprises, compiling a portion of software source code associated with the change information.

12. The system of claim 9, wherein the review policy further comprises:
    if a number of reviewers that approve the change information at least meets a threshold number, approving the change information; and
    if any reviewer disapproves of the change information, rejecting the change information.

13. The system of claim 9, wherein generating the acceptance testing result, further comprises:
    merging the change information into at least a main branch of source code associated with the delivery pipeline;
    provisioning resources that are associated with the new version of the application in an acceptance computing environment; and
    deploying the new version of application to the acceptance computing environment.

14. The system of claim 9, wherein deploying the new version of the application on at least one computing environment, further comprises, if the new version of the application fails on the at least one computing environment, deploying a subsequent revised version of the application on another computing environment that is separate from the at least one computing environment.

15. The system of claim 9, wherein the delivery pipeline, further comprises a plurality of stages, including: a verify stage, a review stage, an acceptance testing phase, a union stage, a rehearsal stage, and a live stage, wherein each stage includes one or more phases that include at least one operation that is affirmatively passed prior to moving to the next stage in the delivery pipeline.

16. The system of claim 9, wherein generating the new version of the application, further comprises, generating at least one build artifact for installing the new version of the application on the at least one computing environment.

17. A processor readable non-transitive storage media that includes instructions for managing delivery of an application over a network, wherein execution of the instructions by a processor device enables actions, comprising:
    providing change information to be used in the application to a delivery pipeline;
    verifying the change information is suitable for use in the application based on at least a static analysis of the change information and at least one unit test of the change information;
    if the change information is affirmatively verified, notifying at least one reviewer to approve the change information based on at least one review policy;
    generating a new version of the application based on the change information;
    performing acceptance testing on the new version of the application, wherein the acceptance testing includes performing one or more functional tests and smoke tests on the new version of the application at a union computing environment that is similar to a live computing environment, and wherein when these one or more tests are successful, provisioning resources in a separate rehearsal computing environment that is equivalent to the union computing environment and performing further functional tests and smoke tests;
    if a result of the acceptance testing is affirmative, enabling a shipping operation in the delivery pipeline for the new version of the application, wherein the delivery pipeline is paused until activation of the enabled shipping operation is approved by an authorized user; and upon activation of the shipping operation, unpausing the delivery pipeline and deploying the new version of the application on at least one network computer in the live computing environment.

18. The media of claim 17, further comprising, if any testing in the delivery pipeline generates a negative result, perform further actions, including:
   rejecting the change information; and
   removing the change information from the delivery pipeline.

19. The media of claim 17, wherein verifying the change information, further comprises, compiling a portion of software source code associated with the change information.

20. The media of claim 17, wherein the review policy further comprises:
   if a number of reviewers that approve the change information at least meets a threshold number, approving the change information; and
   if any reviewer disapproves of the change information, rejecting the change information.

21. The media of claim 17, wherein generating the acceptance testing result, further comprises:
   merging the change information into at least a main branch of source code associated with the delivery pipeline;
   provisioning resources that are associated with the new version of the application in an acceptance computing environment; and
   deploying the new version of application to the acceptance computing environment.

22. The media of claim 17, wherein deploying the new version of the application on at least one computing environment, further comprises, if the new version of the application fails on the at least one computing environment, deploying a subsequent revised version of the application on another computing environment that is separate from the at least one computing environment.

23. The media of claim 17, wherein the delivery pipeline, further comprises a plurality of stages, including: a verify stage, a review stage, an acceptance testing phase, the union stage, the rehearsal stage, and the live stage, wherein each stage includes one or more phases that include at least one operation that is affirmatively passed prior to moving to the next stage in the delivery pipeline.

24. A network computer that is operative for managing delivery of an application over a network using a network, comprising:
   a transceiver that is operative to communicate over a network;
   a memory that is operative to store at least instructions; and
   a processor device that is operative to execute instructions that enable actions, including:
      providing change information to be used in the application to a delivery pipeline;
      verifying the change information is suitable for use in the application based on at least a static analysis of the change information and at least one unit test of the change information;
      if the change information is affirmatively verified, notifying at least one reviewer to approve the change information based on at least one review policy;
      generating a new version of the application based on the change information;
      performing acceptance testing on the new version of the application, wherein the acceptance testing includes performing one or more functional tests and smoke tests on the new version of the application at a union computing environment that is similar to a live computing environment, and wherein when these one or more tests are successful, provisioning resources in a separate rehearsal computing environment that is equivalent to the union computing environment and performing further functional tests and smoke tests;
      if a result of the acceptance testing is affirmative, enabling a shipping operation in the delivery pipeline for the new version of the application, wherein the delivery pipeline is paused until activation of the enabled shipping operation is approved by an authorized user; and
      upon activation of the shipping operation, unpausing the delivery pipeline and deploying the new version of the application on at least one network computer in the live computing environment.

25. The network computer of claim 24, wherein the network computer processor device is operative to enable actions, further comprising, if any testing in the delivery pipeline generates a negative result, perform further actions, including:
   rejecting the change information; and
   removing the change information from the delivery pipeline.

26. The network computer of claim 24, wherein verifying the change information, further comprises, compiling a portion of software source code associated with the change information.

27. The network computer of claim 24, wherein the review policy further comprises:
   if a number of reviewers that approve the change information at least meets a threshold number, approving the change information; and
   if any reviewer disapproves of the change information, rejecting the change information.

28. The network computer of claim 24, wherein generating the acceptance testing result, further comprises:
   merging the change information into at least a main branch of source code associated with the delivery pipeline;
   provisioning resources that are associated with the new version of the application in an acceptance computing environment; and
   deploying the new version of application to the acceptance computing environment.

29. The network computer of claim 24, wherein deploying the new version of the application on at least one computing environment, further comprises, if the new version of the application fails on the at least one computing environment, deploying a subsequent revised version of the application on another computing environment that is separate from the at least one computing environment.

30. The network computer of claim 24, wherein the delivery pipeline, further comprises a plurality of stages, including: a verify stage, a review stage, an acceptance testing phase, a union stage, a rehearsal stage, and a live stage, wherein each stage includes one or more phases that include at least one operation that is affirmatively passed prior to moving to the next stage in the delivery pipeline.

* * * * *